(12) United States Patent
Langlais

(10) Patent No.: US 11,731,898 B2
(45) Date of Patent: Aug. 22, 2023

(54) BIRD-FRIENDLY, THERMALLY-INSULATING GLASS AND METHOD FOR MAKING THE SAME

(71) Applicant: PRELCO Inc.

(72) Inventor: Richard Langlais, Cacouna (CA)

(73) Assignee: PRELCO INC., Quebec (CA)

( * ) Notice: Subject to any disclaimer, the term of this patent is extended or adjusted under 35 U.S.C. 154(b) by 0 days.

(21) Appl. No.: 17/676,281

(22) Filed: Feb. 21, 2022

(65) Prior Publication Data

US 2022/0267197 A1    Aug. 25, 2022

Related U.S. Application Data

(60) Provisional application No. 63/151,427, filed on Feb. 19, 2021.

(51) Int. Cl.
*C03C 15/00* (2006.01)
*C03C 17/00* (2006.01)
*C03C 17/36* (2006.01)

(52) U.S. Cl.
CPC ............ *C03C 15/00* (2013.01); *C03C 17/001* (2013.01); *C03C 17/366* (2013.01)

(58) Field of Classification Search
CPC ...... C03C 17/001; C03C 17/366; C03C 15/00
See application file for complete search history.

(56) References Cited

U.S. PATENT DOCUMENTS

| | | | |
|---|---|---|---|
| 2,127,781 A * | 8/1938 | McKay | C03C 15/00 216/97 |
| 6,857,290 B2 | 2/2005 | Duffy et al. | |
| 9,150,449 B2 | 10/2015 | Theios | |
| 9,422,189 B2 | 8/2016 | Walp | |
| 10,603,871 B2 * | 3/2020 | Yonezaki | B32B 17/10 |
| 10,851,015 B2 | 12/2020 | Peyroux | |
| 10,871,600 B2 | 12/2020 | Theios | |
| 2015/0376935 A1 | 12/2015 | Greiner et al. | |
| 2017/0158553 A1 | 6/2017 | Liang et al. | |
| 2019/0084874 A1 | 3/2019 | Weng et al. | |
| 2021/0222486 A1 | 7/2021 | Veerasamy | |

FOREIGN PATENT DOCUMENTS

| | | | |
|---|---|---|---|
| WO | 2020234040 A1 | 11/2020 | |
| WO | 2020255088 A1 | 12/2020 | |

\* cited by examiner

*Primary Examiner* — Michael P Wieczorek
(74) *Attorney, Agent, or Firm* — PCFB LLC

(57) ABSTRACT

A method for manufacturing a glazing. A low-emissivity protected glass piece has a low-emissivity coating applied to a second face thereof and a protective film covering the low-emissivity coating. The glass piece is placed on a surface of a screen printing table, the protective layer being in contact with said surface. Acid etching is performed with an acid paste which attacks the first face of the low-e protected glass piece to print visual markers thereon using a screen printing canvas on the first face. After waiting, the first face of the low-e protected glass piece is washed to remove the acid paste to obtain a permanent frosted finish pattern forming the bird-friendly visual markers on the first face. The protective film is removed to obtain a low-e marked glass having visual markers on one side and a low-e coating on another side, and then the marked glass is tempered.

12 Claims, 12 Drawing Sheets

Fig. 1 *PRIOR ART*

BIRD-FRIENDLY, THERMALLY-INSULATING GLASS AND METHOD FOR MAKING THE SAME

RELATED APPLICATION

The present application claims priority to and benefit of U.S. provisional patent application No. 63/151,427, filed Feb. 19, 2021, the disclosure of which is incorporated herein by reference in its entirety.

TECHNICAL FIELD

The subject matter disclosed generally relates to glass with thermal insulation properties. More specifically, it relates to a method of manufacturing a bird-friendly glass having high-performance ("low-e") thermal insulation properties.

BACKGROUND

Bird safety considerations. When considering glass used in buildings such as skyscrapers, some of the physical properties of glass adversely affect bird safety, in particular its transparency and reflexivity. While the transparency of the glass does not allow the birds to detect the obstacle to avoid (i.e., the glass itself, which is transparent and hard to see), its reflective aspect allows the birds to see their own reflection in the glass, or that of the sky and vegetation. They are deceived by these false representations and will hit the windows. These accidents are more common in areas near waterways, parks, wooded areas and migration corridors.

Bird-friendly regulations. In 2007, Toronto became one of the first cities in the world to have a guide for protecting migratory birds. The "Bird-Friendly Development Guidelines" contains a list of preventive measures to ensure that new and existing buildings are less dangerous for birds. The guide was developed with input from architects, property management companies, bird-protection groups and city staff. Several other cities subsequently followed suit.

Recommendations from the Bird-Friendly Development Guidelines. The Bird-Friendly Development Guidelines contains several measures to be applied when designing buildings to minimize the impact on birds. First, the amount of glass and high-risk items have been minimized. Once this is done, the remaining glass should be bird-friendly. The most effective method to make a glass "bird-friendly" is to create markers that would be visible to the birds on the glass to let birds know about the presence of the glass.

SUMMARY

According to an aspect of the disclosure, there is provided a method for manufacturing a glazing comprising the steps of:
  providing a low-emissivity protected glass piece having a glass piece with a first face and a second face, the first face opposing the second face, the low-e protected glass piece having a low-emissivity coating applied to the second face of the glass piece and a protective film covering the low-emissivity coating;
  placing the low-emissivity protected glass piece on a surface of a screen printing table, the protective layer being in contact with the surface of the screen printing table;
  using a screen printing canvas on the first face, performing an acid etching with an acid paste which attacks the first face of the low-e protected glass piece to print visual markers thereon;
  after having waited for a period of time, washing the first face of the low-e protected glass piece to remove the acid paste to obtain a permanent frosted finish pattern forming the visual markers on the first face;
  removing the protective film to obtain a low-e marked glass having visual markers on one side and a low-e coating on another side; and
  following the removing of the protective film, tempering the low-e marked glass.

According to an embodiment, there is a further step of providing a glass piece, prior to placing the low-emissivity protected glass piece on the surface of the screen printing table; and applying a protective film onto the transparent low-emissivity coating of the glass piece to obtain a low-emissivity protected glass piece.

According to an embodiment, the period of time is ranging between 2 and 6 minutes.

According to an embodiment, the period of time is about 5 minutes.

According to an embodiment, the low-emissivity coating is transparent in a visible spectrum.

According to an embodiment, the tempering of the low-emissivity marked glass is performed when the visual markers are in contact with rollers of a conveyor of a tempering furnace.

According to another aspect of the disclosure, there is provided a method for manufacturing a glazing comprising the steps of:
  providing a low-emissivity protected glass piece (also referred to herein as a "low-e protected glass piece") having a glass piece with a first face and a second face, the first face opposing the second face, the low-e protected glass piece having a low-emissivity coating applied to the second face of the glass piece and a consumable protective layer covering the low-emissivity coating;
  placing the low-e protected glass piece on a screen printing table, the protective layer of the low-e protected glass piece being in contact with the surface of the table;
  using a screen printing canvas on the second face, performing an acid etching with an acid paste which attacks the second face to print visual markers thereon;
  after having waited for a period of time, washing the glass to remove the acid paste to obtain a permanent frosted finish pattern forming the visual markers; and
  tempering the low-emissivity marked glass (in at least one embodiment having on one side/face the permanent frosted finish pattern forming the visual markers and having on another side/face the consumable protective layer covering the low-emissivity coating) while leaving the protective layer in a tempering furnace for burning during tempering.

According to an embodiment, there is a further step of providing a glass piece, prior to placing the low-emissivity protected glass piece on the surface of the screen printing table; and applying a protective film onto the transparent low-emissivity coating of the glass piece to obtain a low-emissivity protected glass piece.

According to an embodiment, the period of time is ranging between 2 and 6 minutes.

According to an embodiment, the period of time is about 5 minutes.

According to an embodiment, the low-emissivity coating is transparent.

According to an embodiment, the tempering of the low-emissivity marked glass is performed when the visual markers are in contact with rollers of a conveyor of a tempering furnace.

According to another aspect of the disclosure, there is provided a glazing manufactured using the methods as described herein, the glazing comprising a glass piece with a first face and a second face, the first face opposing the second face, the low-e protected glass piece having a low-emissivity coating applied to the second face of the glass piece and on the first face a permanent frosted finish pattern forming the visual markers obtained as described herein.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
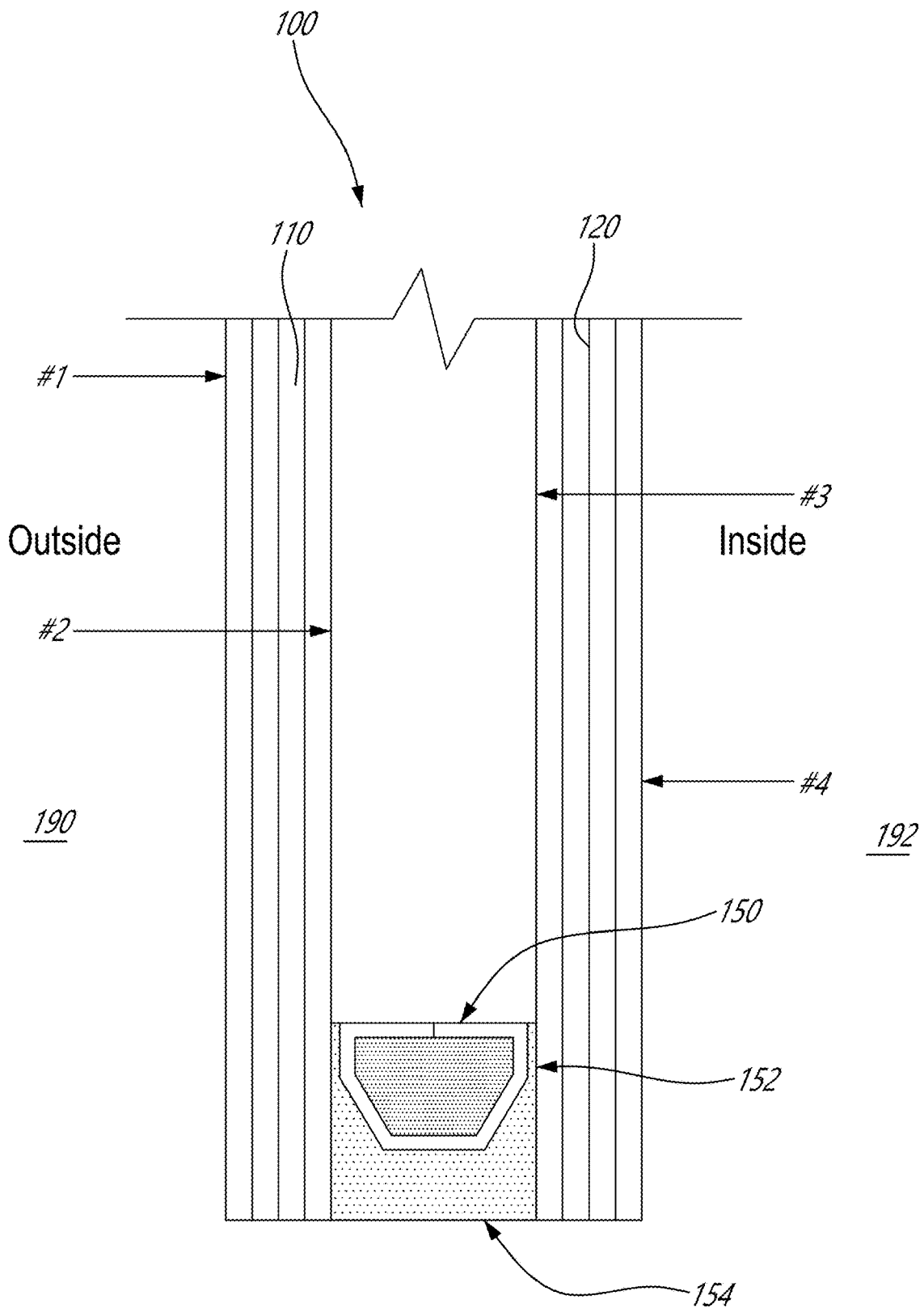
FIG. 1 is a schematic diagram illustrating standard face numbering in glazing, according to an embodiment of the invention.

Identification of glass faces in a sealed unit. FIG. 1 shows how glass surfaces are identified in a conventional sealed unit 100 (the term "sealed unit" may be also referred to as "glazing" and "glazing unit") having at least two glass layers: an outside glass layer 110 and an inside glass layer 120. This is a standard, widely-recognized method of identification and numbering of faces of a sealed unit. The term "face 1" or "face number 1" refers to the surface of the glazing which is in contact with the exterior 190 of a building (also referred to herein as "outside 190"). Glass faces 1, 2, 3, 4 are then numbered in increasing numbers from the outside to the inside of the building 192.

Still referring to FIG. 1, in the conventional sealed unit 100 a metal spacer 150 is placed in between of the outside glass layer 110 and an inside glass layer 120. For example, the metal spacer 150 may have a desiccant. A primary seal 152 and a secondary seal 154 are used to seal the metal spacer 150, the outside glass layer 110 and the inside glass layer 120 together.

Figure 2:
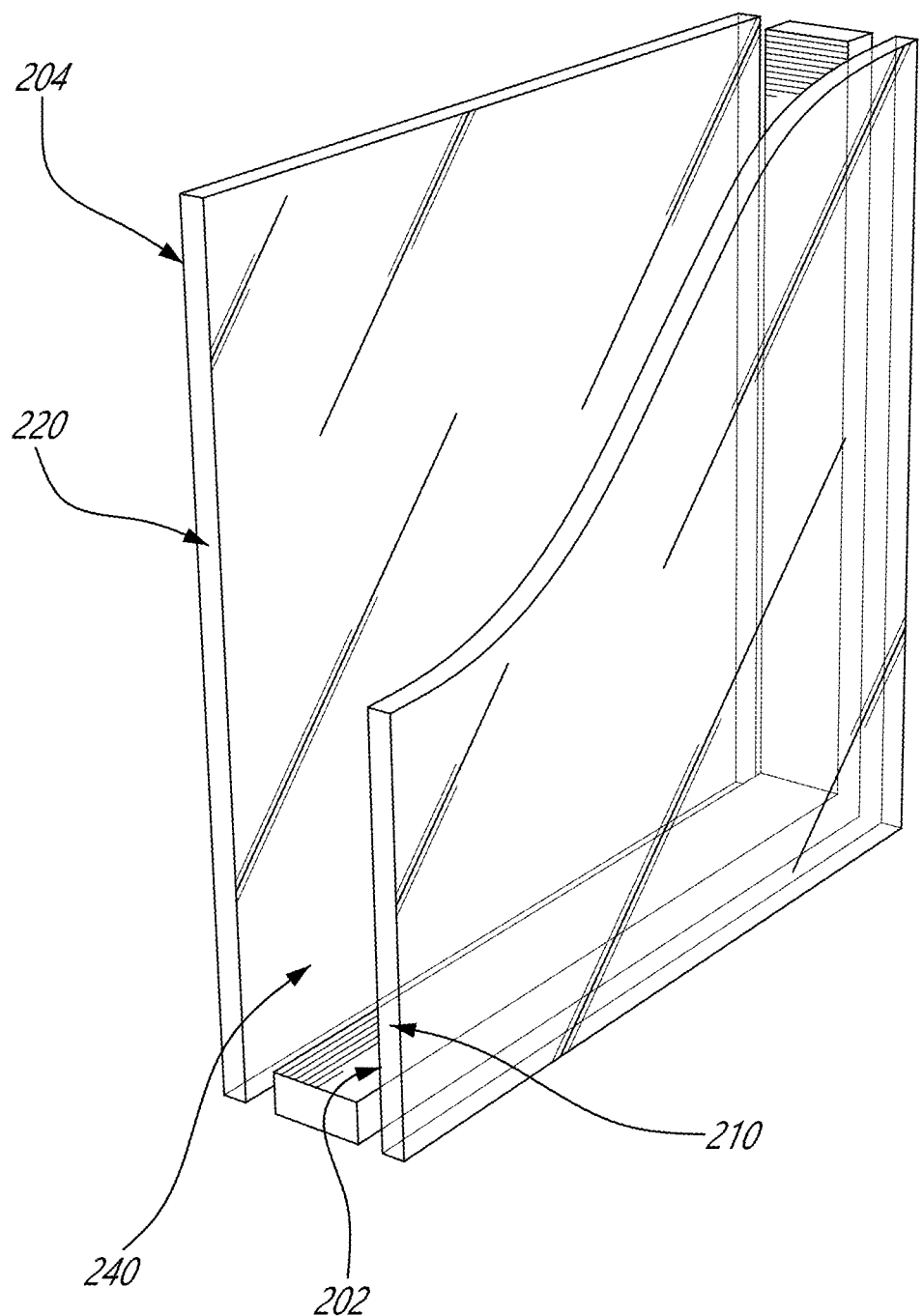
FIG. 2 is a perspective view illustrating low-e coating placement in a double insulating glazing, according to an embodiment of the invention.
Figure 3:
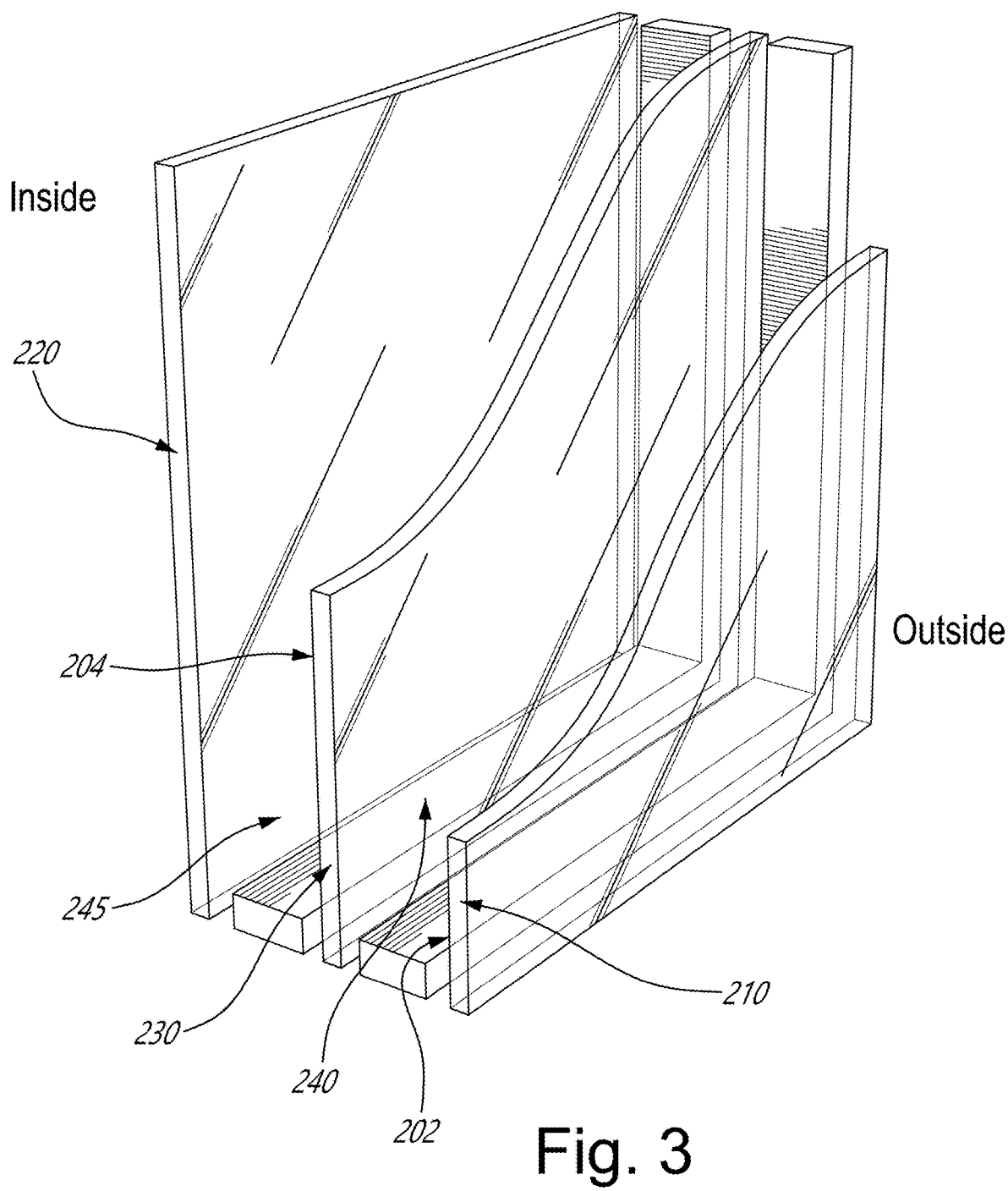
FIG. 3 is a perspective view illustrating low-e coating placement in a triple insulating glazing, according to an embodiment of the invention.

Normal thermally-insulating glass. Because glass is a good conductor and poor insulator, a single sheet of glass offers little thermal resistance to prevent heat gain or loss in or from a building interior. Insulating glazing was developed to address this issue. To put it simply, there are mainly two types of insulating glazing: double insulating glazing and triple insulating glazing. As shown in FIG. 2, double insulating glazing is formed by the assembly of an outside glass 210 and an inside glass 220 separated by an air chamber 240. To use industry-standard terminology, the outside glass 210 is tinted, clear (or standard) or extra-clear (also known as low-iron class, which has smaller iron contents to remove greenish or bluish tint in the standard clear glass). The inside glass 220 may be clear or extra-clear. As shown in FIG. 3, a triple insulating glazing is made of 3 glasses 210, 220, 230 separated by two air chambers 240, 245.

High-performance ("Low-e") thermally-insulating glasses. In order to make the insulating glazing more efficient, a transparent low-emissivity coating also called a "low-e" coating is applied on face 2 in double insulating glazing (referred to herein as a face 202 with reference to FIG. 2) and on faces 2 and 4 in triple insulating glazing referred to herein as faces 202 and 204 with reference to FIG. 3. There are different types of low-emissivity coatings. The most efficient low-emissivity coatings that allow the manufacture of high-performance insulating glazing are applied by a vacuum deposition method.

Application of high-performance low-e coating on glass. High-performance low-emissivity coatings are made up of multiple layers of silver separated by protective layers. These different layers are applied by vacuum deposition. These coatings have the particularity of being sensitive to scratches and oxidation. The coating, and especially each layer being applied during the manufacturing process, should therefore be handled with care, avoiding contact. Once the insulating glazing is assembled, the low-emissivity coating is located inside the glazing cavity and is therefore protected from any contact with the outside world (such as the outside or the inside of the building). Some manufacturers have developed methods to protect the low-emissivity coating. Depending on the manufacturer, different techniques are used as protective barriers during transport and the various operations which precede the assembly of the glass into insulating glazing. One of the protection techniques is to apply a self-adhesive plastic film commonly known as temporary protective film (TPF) over the low-emissivity coating. Another known technique is to apply a protective layer on top of the low-emissivity coating using an applicator roller.

Passage of the low-e coated glass in the tempering furnace. In order to increase the mechanical resistance to wind loads of the glass used in the manufacture of sealed units, the glass may be tempered, i.e., it is passed through a tempering furnace to increase its eventual resistance to such forces.

Figure 4:
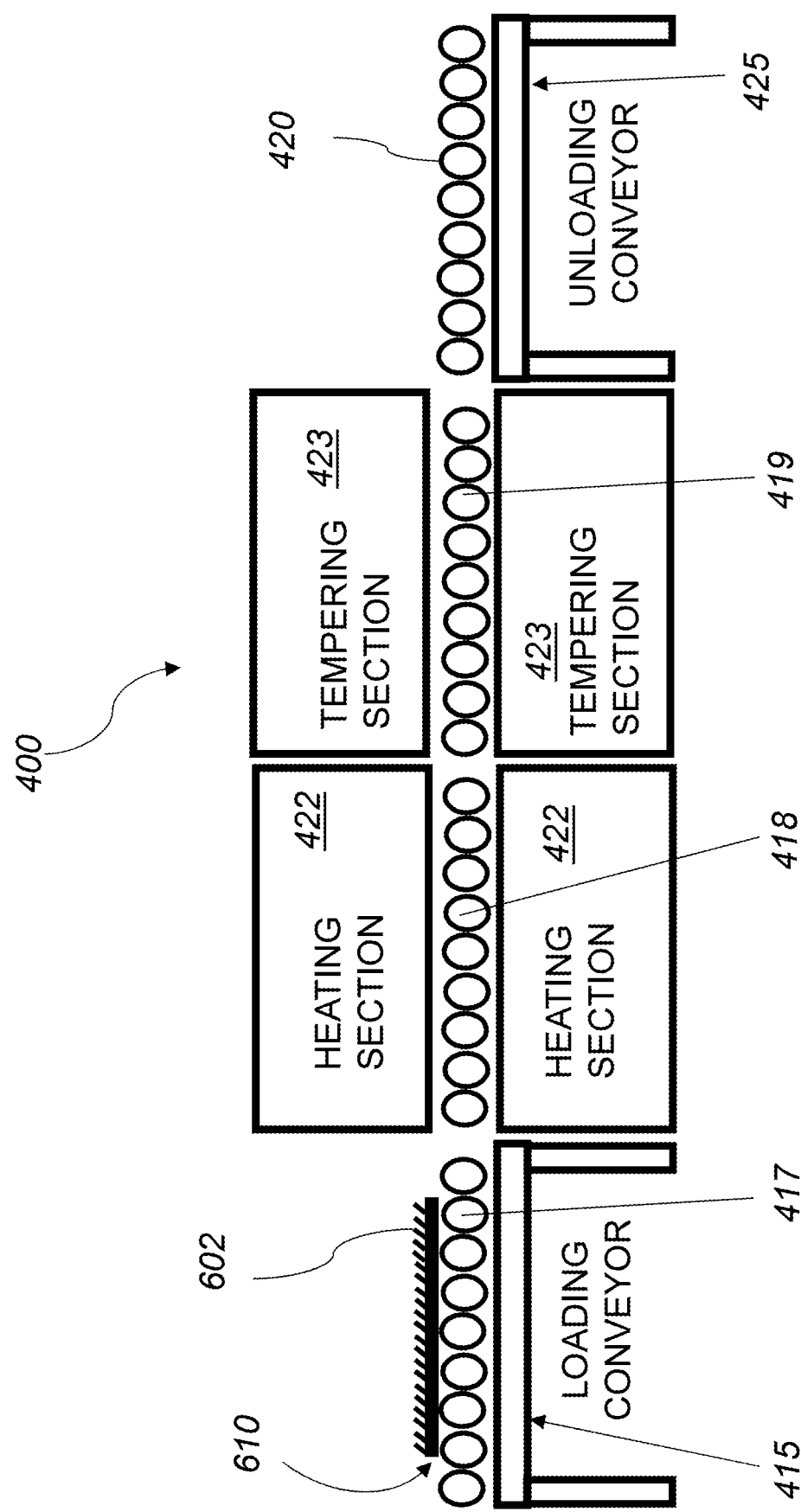
FIG. 4 depicts a schematic diagram illustrating a tempering furnace that may be used for tempering the glass with a glass section, according to an embodiment of the invention.

FIG. 4 depicts a tempering furnace 400 that may be used for tempering the glass. A glass section 610 passes through the tempering furnace 400. The glass section 610 is placed horizontally on a roller loading conveyor 415. Due to its fragility, the face of the glass section 610 which has the low-emissivity coating 602 cannot be brought into contact with the rollers of the tempering furnace because it would be damaged. It is therefore obligatorily to place the face that does not have a low-emissivity coating on the rollers 417 and while the other, opposed face with the low-emissivity coating, is faced upwards as shown in FIG. 4. In FIG. 4, the glass section 610 is positioned on the rollers 417 such that the face that touches the rollers 417 does not have the low-emissivity coating and the face that is faced upwards has the low-emissivity coating. During the tempering process, the glass section 610 moves from the loading conveyor 415 and passes across heating section 422 and tempering section 423 towards the unloading conveyor 425.

Figure 6:
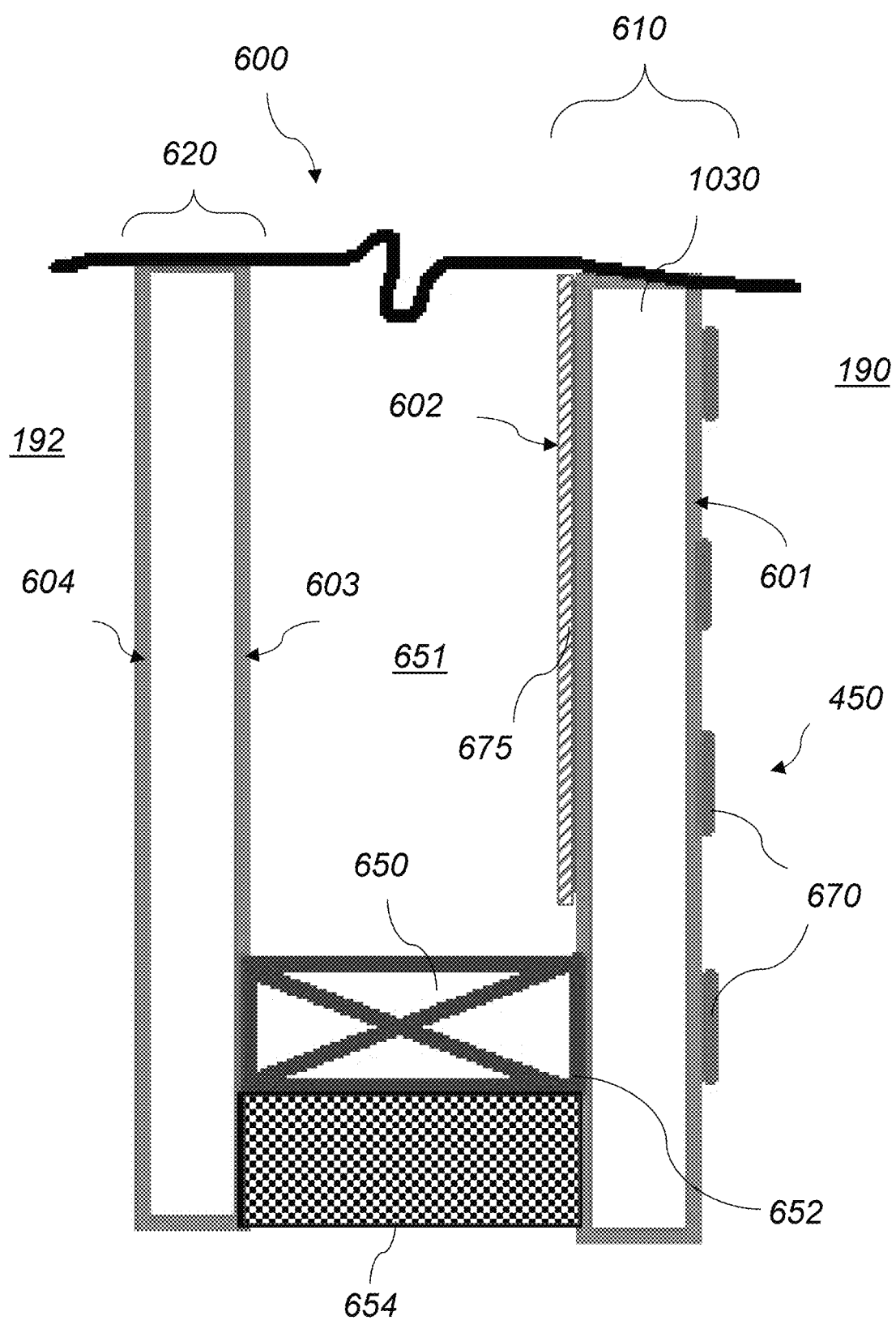
FIG. 6 is a cross-section illustrating a positioning of a low emissivity layer and a frit ceramic pattern in an assembly of a double insulating glazing, according to an embodiment of the invention.

FIG. 6 depicts a double-insulating glazing unit 600, in accordance with at least one embodiment of the present technology. As depicted in FIG. 6, the double-insulating glazing unit 600 comprises an outside glazing 610, facing the outside of the building 190, and an internal glazing 620 facing the inside of the building 192. The outside glazing 610 and internal glazing 620 are separated by a spacer 650 to form an air chamber 651. The spacer 650 is bonded to the outside glazing 610 and internal glazing 620 with a primary seal 652 and a secondary seal 654.

Figure 7:
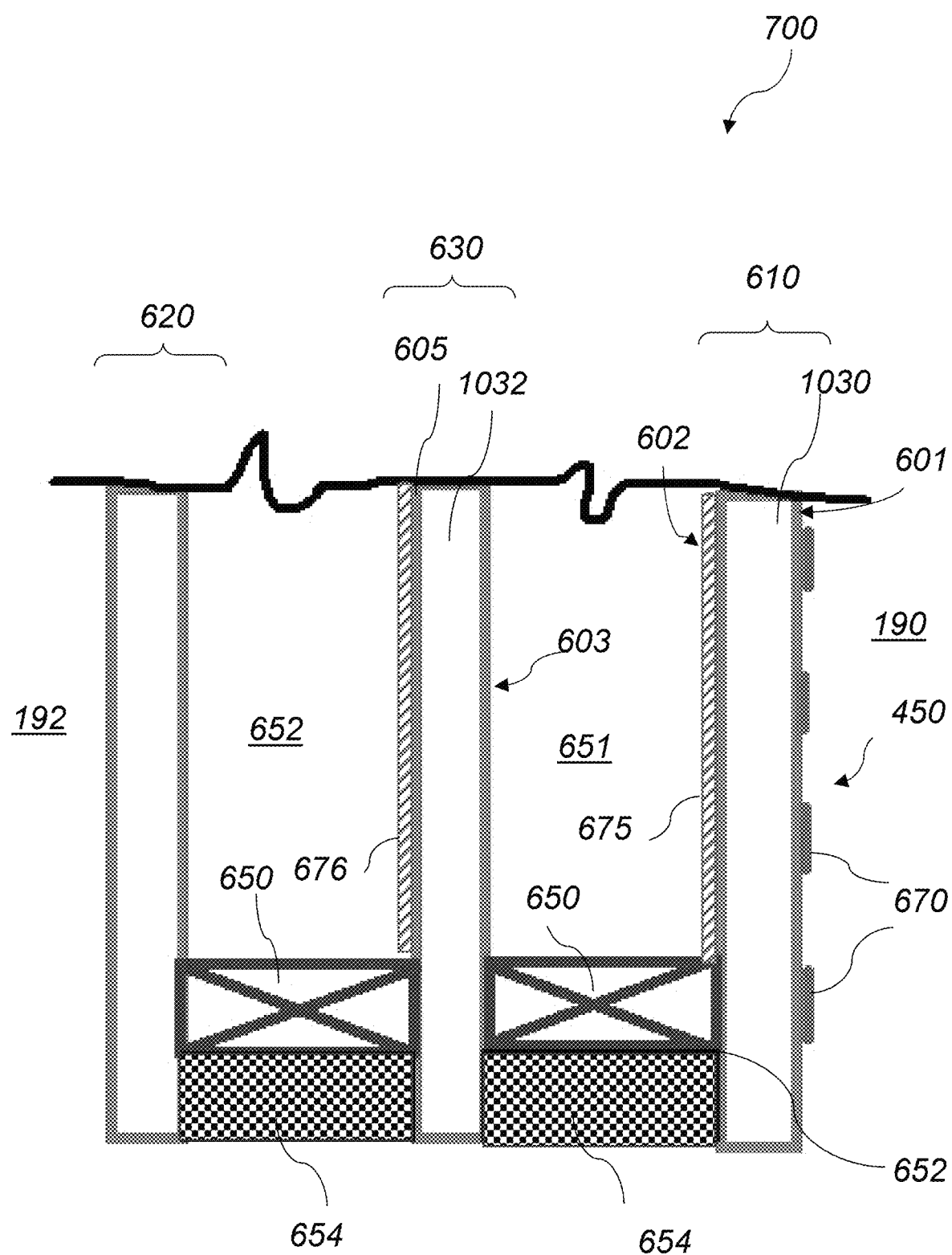
FIG. 7 is a cross-section illustrating a positioning of a low emissivity layer and a frit ceramic pattern in an assembly of a triple insulating glazing, according to an embodiment of the invention.

FIG. 7 depicts a triple-insulating glazing unit 700, in accordance with at least one embodiment of the present technology. The triple-insulating glazing unit 700 has the outside glazing pane 610, the internal glazing 620, and an intermediate glazing 630. The faces of the outside glazing 610 are referred to herein as face 601 (facing the outside of the building 190), face 602 (facing the first air chamber 651). The faces of the intermediate glazing 630 are referred to herein as face 604 (facing the inside of the second chamber 652), face 603 (facing the first air chamber 651).

Effect of visual markers. In order to deter the birds away from a glazing unit, visual markers may be added to an outside glazing 610. Visual markers that are spaced apart by 5 cm or less were found to be effective for preventing birds from colliding with glass. The size of the markers and the distance between adjacent markers have been determined by tests and observations in order to be as effective as possible in reducing the risk of collision. The denser the markers, the more effective they are.

The markers should also show high contrast. If the contrast is subtle to the human eye, it will also be subtle for birds. To make sure that the birds are notified of the glass, and therefore to make the glass bird-friendly, the bird-friendly glass needs to have higher contrast, thus the contrast of the glass needs to be increased. Only non-reflective glasses combined with a frit ceramic pattern should be used. Visual markers are more visible when placed on face 601 (outer surface of the glass) because in this position they are not obscured by reflection from the surface of the glass 1030. The application of visual markers on face 602 and face 603 can help reduce the risk of collision, but they are less effective when provided at these positions. The optimal solution is therefore the application of frit ceramic patterns on face 601 of the glass, in other words, the application of frit ceramic patterns on face 601 of the outside glazing 610.

In the method described herein, the contrast is increased by placing the markers on face 601, instead of face 602. The contrast would be attenuated when the markers are placed on face 602 because of the reflection caused by the face 601. If the markers would be applied on face 602, the contrast would be attenuated because of the reflection caused by the face 601.

In FIGS. 6 and 7, the outside glazing 610 comprises a glass layer 1030, a frit ceramic pattern 450 on face 601 (facing the outside of the building 190), and a low-e coating 675 facing the first air chamber 651. The intermediate glazing 630 comprises a second glass layer 1032 and a second low-e coating 676 on face 605 facing the second air chamber 652.

Application, onto glass, of frit ceramics acting as a visual marker. One of the techniques for applying visual markers on glass comprises printing patterns using frit ceramic paint and applying it using a screen printing process. The frit ceramic paint is applied in 3 stages: screen printing, drying and finally baking (vitrification) of the paint. The first step comprises depositing the frit ceramic paint in specific places on a glass piece by the screen printing process, so as to form the desired pattern. The glass piece with the frit ceramic paint then passes through a drying oven to evaporate the medium. After this step, only the frit and the color pigments remain on the surface of the glass. The frit ceramic paint adheres to the surface of the glass piece sufficiently to be handled with care, but not sufficiently to be assembled in thermally-insulating glass. It is only after the glass piece has passed through the tempering furnace 400, in which the glass piece is heated to reach a temperature of 620 Celsius (C), that the frit ceramic paint vitrifies and becomes an integral part of the glass. Then the frit ceramic paint adheres sufficiently to the glass piece to be assembled into a thermally-insulating glass.

Figure 5:
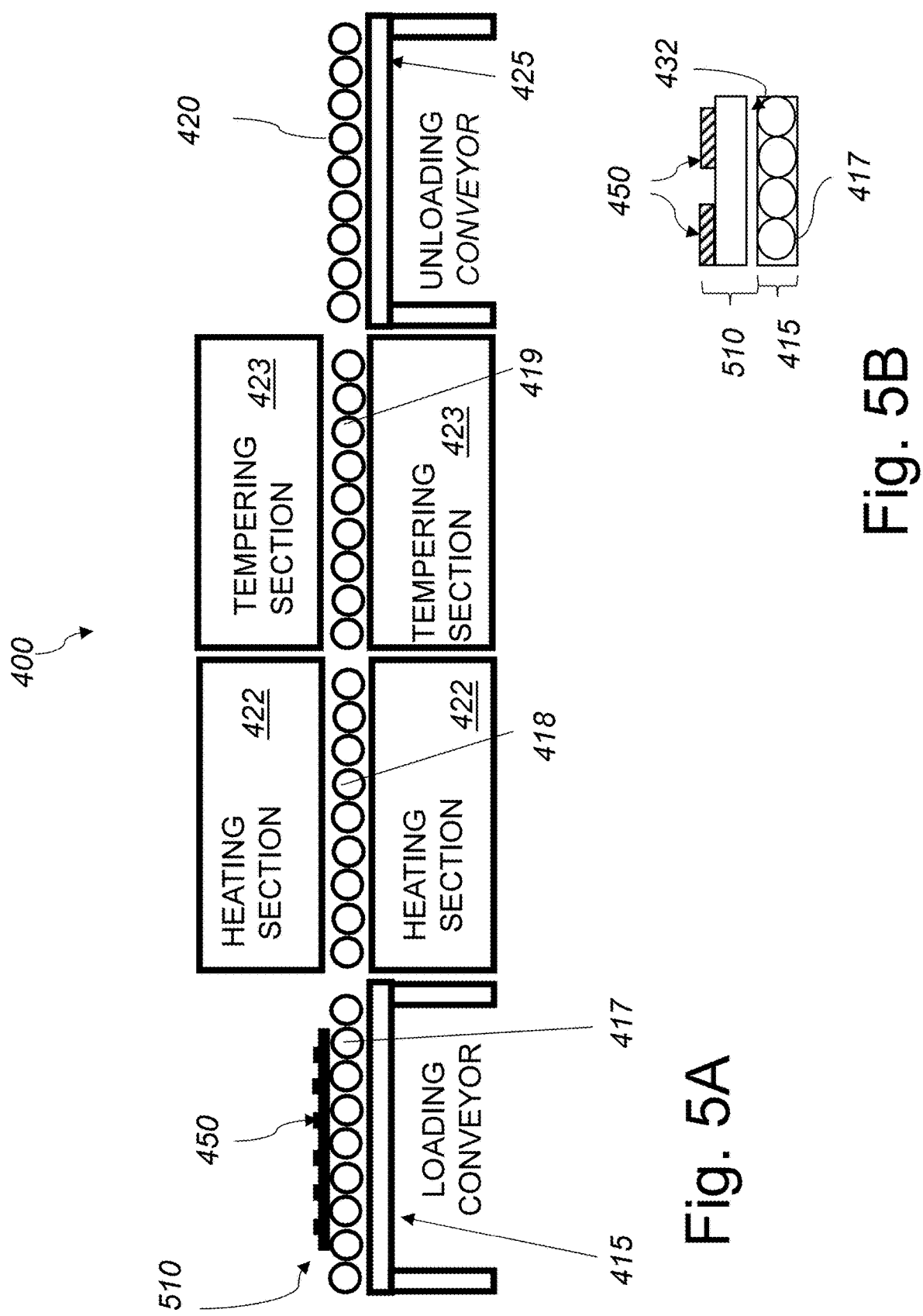
FIG. 5A depicts a schematic diagram illustrating the tempering furnace of FIG. 4 with a frit ceramic printed glass piece, according to an embodiment of the invention.
FIG. 5B schematically illustrates a frit ceramic printed glass piece, according to an embodiment of the invention.

Passage of frit ceramic printed glass in the tempering furnace. FIG. 5A depicts the tempering furnace 400 of FIG. 4. Referring also to FIG. 5B, the glass piece with printed frit ceramic 510 (also referred to herein as a "frit ceramic printed glass piece 510") passes through the tempering furnace 400. For this, the shaped frit ceramic printed glass piece 510 is placed (laying) horizontally on a roller loading conveyor 415 formed by rollers 417. Because of the fragility of the frit ceramic print, the face of the frit ceramic printed glass piece 510 with the pattern printed with ceramic frits—frit ceramic pattern 450—cannot be put in contact with the rollers 417, 418, 419, 420 of the different sections of the tempering furnace 400, as the pattern printed with frit ceramic (frit ceramic pattern 450) would be damaged by this process. In addition, since the frit ceramic paint has not yet been vitrified (as the tempering is not yet completed), the frit ceramic paint would adhere to the ceramic rollers 418 of the heating section 422 and stain the ceramic rollers 418 irreversibly. Therefore, the face 432 of the piece of glass that does not have a frit ceramic pattern 450 must be placed on the rollers. In other terms, the frit ceramic printed glass piece 510 should be placed on the rollers 417 such that the frit ceramic pattern 450 does not touch the rollers 417. The face where the patterns are printed must face upwards as depicted in FIGS. 5A, 5B, when positioned for tempering and then entered the heating section of the tempering furnace 400.

Fabrication of a high-performance insulating glazing meeting bird-friendly guidelines (i.e., proper visible markers). FIGS. 6 and 7 depict the insulating glazing units 600, 700 that meet the "bird friendly" glass requirements. In such insulating glazing units 600, 700 the exterior glass, provided by the outside glazing 610 having faces 601 and 602, has on one side or face the low-emissivity layer 675 (also referred to herein as a low-emissivity coating 675) and on the other side or face, the "bird friendly" frit ceramic pattern 450. According to an embodiment of the invention, when assembling the insulating glass unit 600, 700, the side or face of the glass piece 1030 with the printed frit ceramic pattern 450 faces outwardly (toward the outside of the building 190) and the side or face with the low-emissivity layer 675 faces inwardly (toward the inside of the building 192). FIGS. 6-7 show schematically the assembly is of double insulating glazing unit 600 (FIG. 6) and of triple insulating glazing unit 700 (FIG. 7).

Manufacturing process and assembly of bird-friendly, high-performance low-e glazing units 600, 700. To manufacture a high-performance insulating glazing units 600, 700 meeting bird-friendly requirements, the visual markers need to be applied on face 601 and a low emissivity coating is applied on face 602. During the tempering operation, none of these two faces may be placed in contact with the rollers 417 of the tempering furnace 400 (FIGS. 4, 5A). The visual markers 670 need to be printed such that they are strong enough not to be damaged by contact with the rollers 417, 418, 419, 420 of the tempering furnace 400 as the outside glazing 610 with the visual markers 670 passes through the tempering furnace 400.

The visual markers 670 may be created (manufactured) by etching the surface of the glass piece 1030 using an acid etching process. Visual markers created (manufactured) in this way are much stronger and may come in contact with the rollers 417, 418, 419, 420 of the glass tempering furnace 400.

With the existing conventional method, acid etching of patterns on glass is performed while protecting the surface of the pattern-free glass with an emulsion that prevents acid from coming into contact with the surface of the pattern-free glass. The glass is then immersed in an acid basin or exposed to the acid by a curtain coater or any other industrial way so that surfaces not protected by the emulsion are provided with a frosted finish when in contact with the acid, and the surfaces protected by the emulsion remain intact. Since it is not economically viable to protect the low-emissivity coating of high-performance low-e glasses during this operation, the acid etching operation is performed first.

Figure 8:
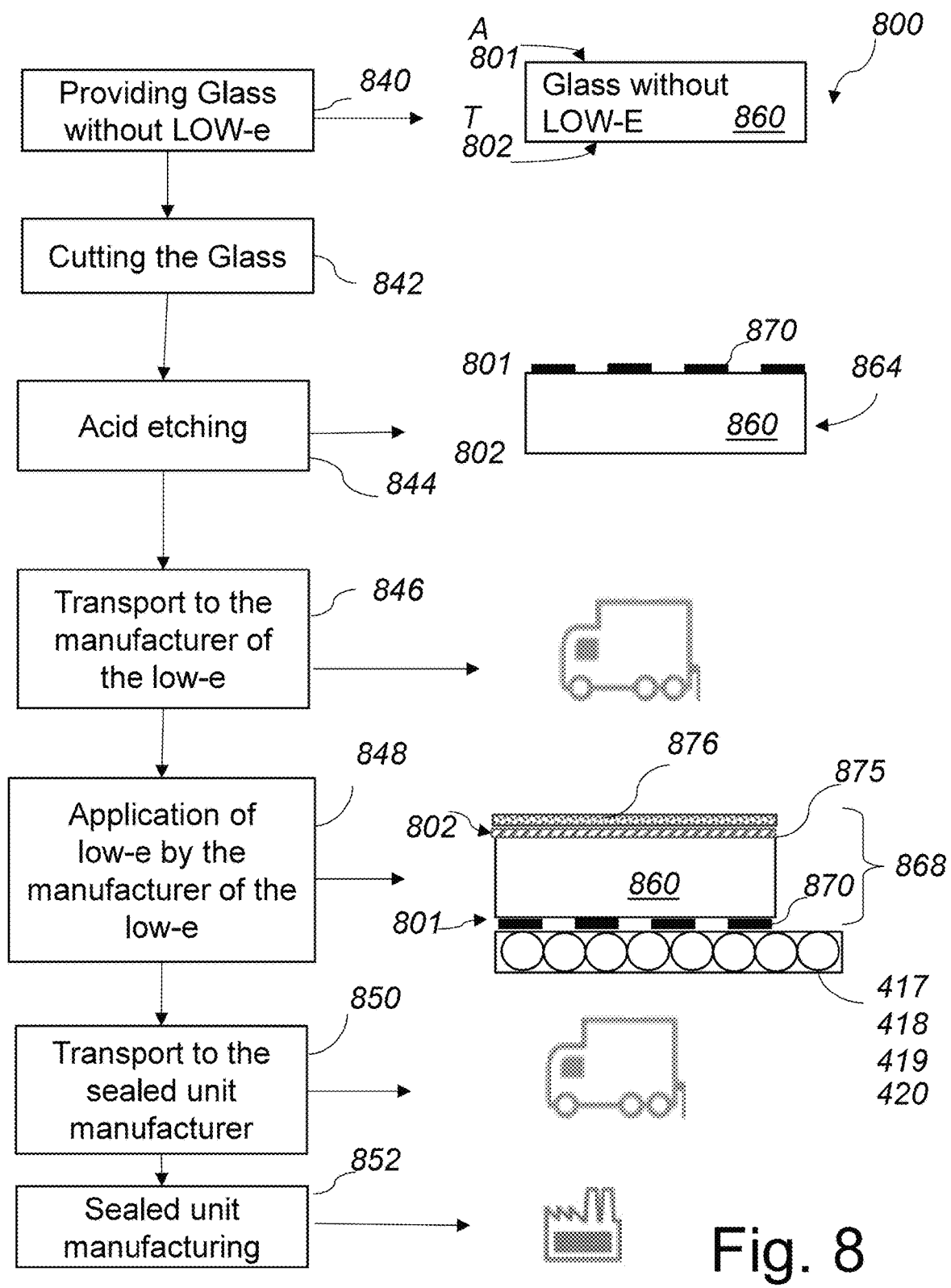
FIG. 8 illustrates a conventional method of manufacturing of a glazing unit.

Referring to FIG. 8, in such a conventional method 800, the glass piece without low-emissivity coating is first provided at step 840. The glass piece without low-emissivity coating may be cut at step 842. At step 844, acid etching is performed. The patterns 870 are created by acid-etching on the glass sheets 860 without low-e coating. Once the patterns 870 are created on face 801 of the glass sheets 860, the glass units with patterns 864 are then shipped elsewhere (step 846), i.e., to the high-performance low-e glass manufacturer for the application of the low-emissivity coating on the glass units with patterns 864.

At step 848, the low-e coating is applied to the face 802 of the glass units with patterns 864. The face 802 is opposite to the face 801 where the acid-etched visual markers 870 have been applied earlier. The acid-etched visual markers 870 are strong enough to pass through the tempering furnace 400 of FIGS. 4, 5, while being in contact with the rollers 417, 418, 419, 420.

Finally, the piece of glass 868 having one face 801 with the acid-etched visual markers 870, and therefore strong enough to pass through the tempering furnace 400 while being in contact with the rollers 417, 418, 419, 420 and the other face 802 on which the low-emissivity coating 875 has been applied and protected, is transported at step 850, without limitation, to a third factory where it is ready to be cut, tempered, and finally assembled at step 852 in high performance insulating glass that may serve as an outside glazing 610 of the double-insulating glazing unit 600 or triple-insulating glazing unit 700 meeting the requirements of the "bird-friendly" glass.

Figure 9:
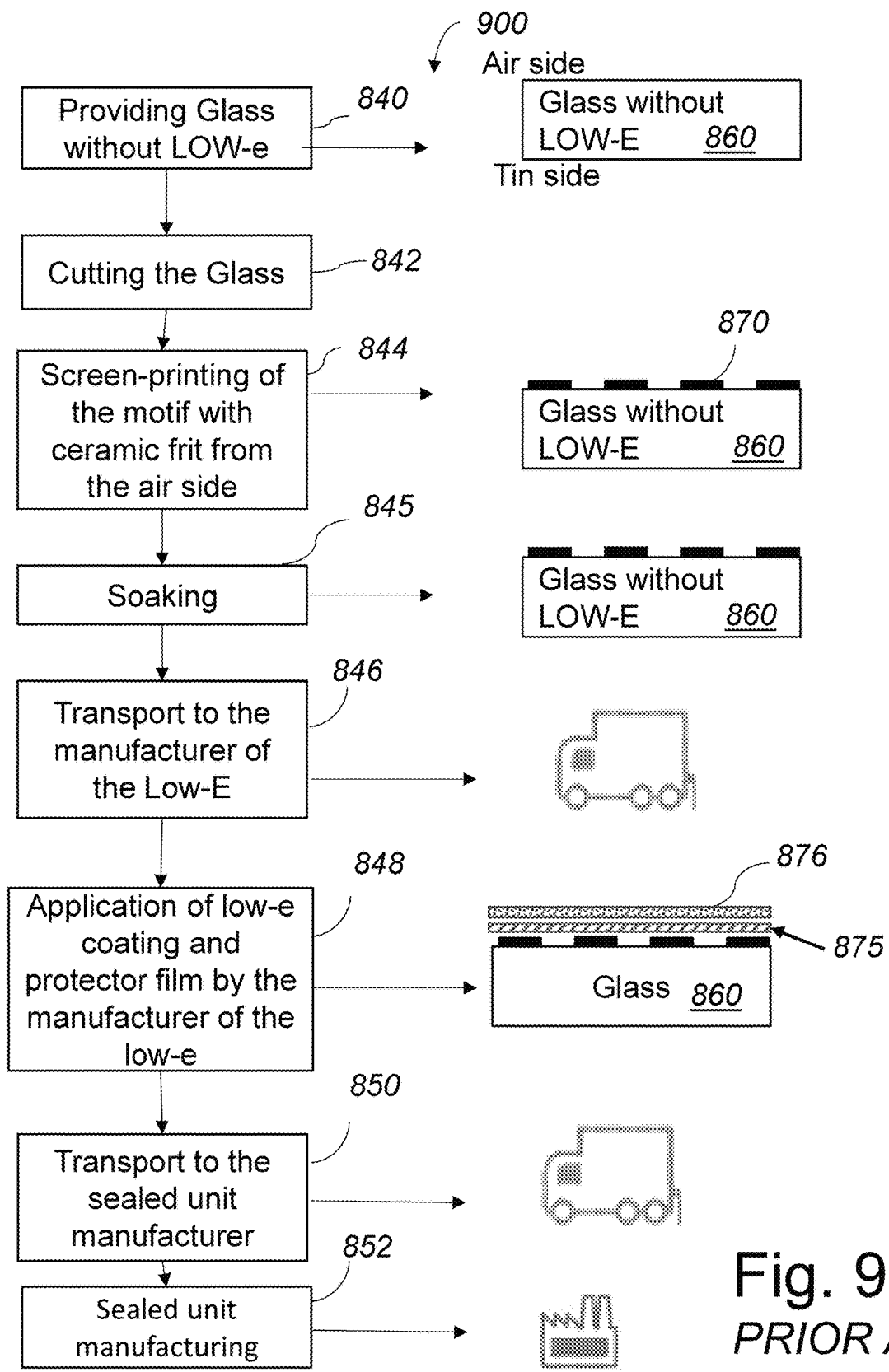
FIG. 9 illustrates another conventional method of manufacturing of a glazing unit.

FIG. 9 illustrates another conventional method 900 of manufacturing of a bird-friendly glass unit. This known method 900 consists in applying ceramic frit 870 on the same face as the low-e coating 875. At steps 840-842, a glass piece 860 without low-e coating is provided and then cut. At step 844, the screen-printing of the motif with the ceramic frit 870 is performed at the air side, (which is the side laying upward, exposed to ambient air, and opposed to the other side laying on a surface). At step 845, the glass 860 is soaked and then the glass piece, still without low-e and with markers 870 is transported to the manufacturer of low-e coatings at step 846.

At step 848, the low-e coating 875 and protective film 876 on top of the low-e coating 875 are applied by the manufacturer of the low-e coatings. At step 850, the glass 860 with the markers 870, low-e coating 875 and the protective film 876 applied manufactured on one side of the glass piece 860, are transported to the manufacturer of the sealed units, which may then manufacture the sealed units.

In such conventional method 900, the visual markers are however applied on face 602, and not on face 601 of the glazing 610 and the visual markers are not on the best surface to be detected by the birds.

Manufacturing Process and Assembly of Bird-Friendly, High-Performance Low-e Glazing.

Figure 10:
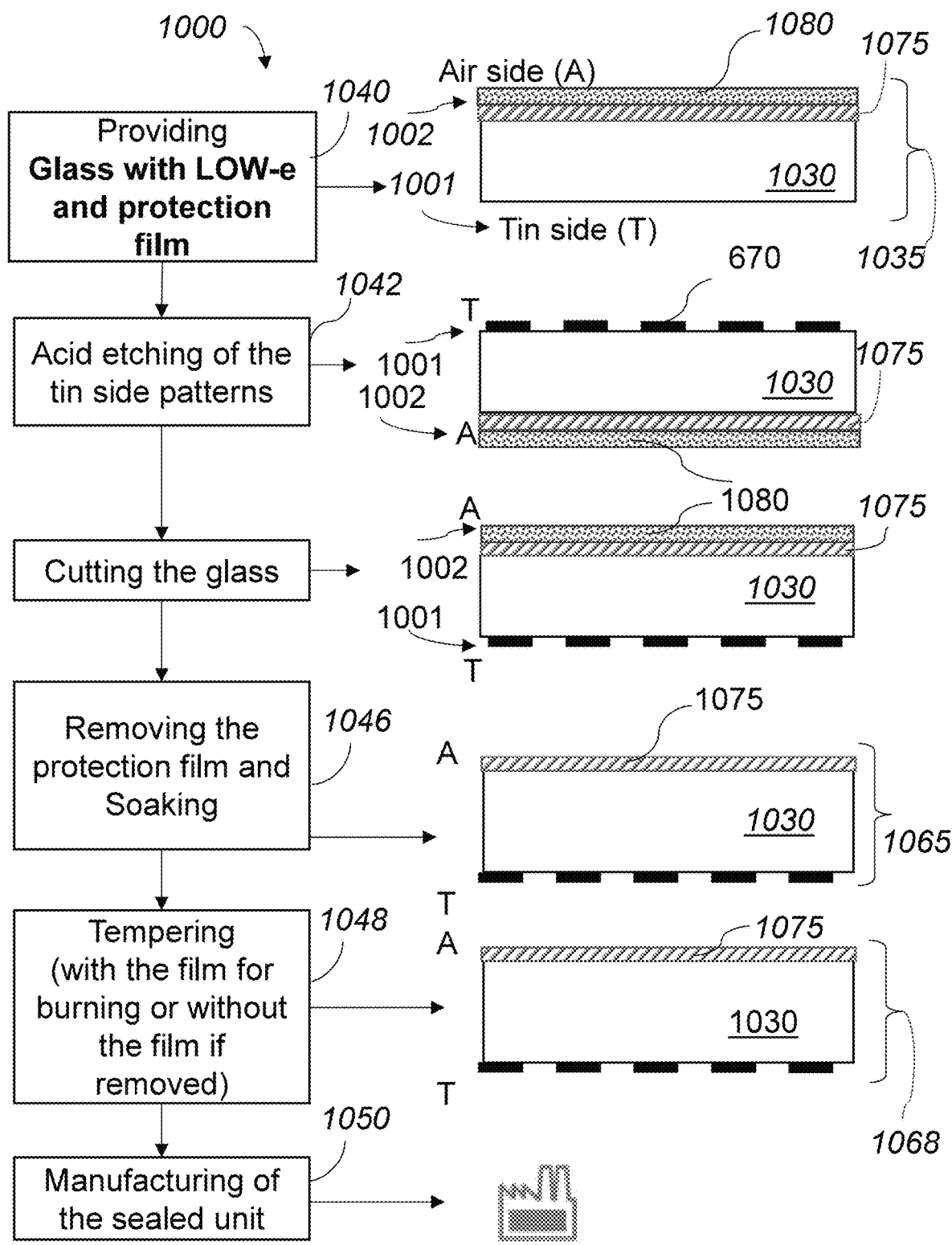
FIG. 10 illustrates a method of manufacturing of glazing and glazing unit, in accordance with at least one embodiment of the present disclosure.

FIG. 10 illustrates the method 1000 for fabricating glazing 1068, in accordance with at least one embodiment of the present disclosure. First, a glass piece 1030 with low-e coating 1075 and protective film 1080 (referred to herein as "low-emissivity protected glass piece 1035" or "low-e protected glass piece 1035") is provided at step 1040. The low-e protected glass piece 1035 has a low-emissivity coating 1075 applied to the second face 1002 of the glass piece and a protective film 1080 covering the low-emissivity coating 1075. To manufacture such a low-e protected glass piece 1035, a protective film 1080 is applied onto the transparent low-emissivity coating 1075 (transparent in the visible spectrum) of the glass piece 1030.

In at least one embodiment, the protective film 1080 may be a consumable protective layer, which may be removed by burning (burnt).

According to an embodiment of the invention, the method 1000 then comprises performing an acid etching, at step 1042, on the face 1001 of a high-performance low-e glass 1030 already protected by a protective film or a protective layer 1080.

In at least one embodiment, the method 1000 described herein uses a glass piece 1030 with low-e coating 1075, already applied. In such an embodiment, the low-e coating 1075 of the glass piece 1030 is already protected by the protective layer 1080, and such a low-e protected glass piece 1030 is delivered from a manufacturer of the low-e glass. The protective layer 1080 is sufficiently resistant to protect the low-e coating 1075 during the handling and when putting it in contact with rollers 417, wheels, belts or other items which would permit the displacement of the low-e protected glass piece 1035 on the conveyers of a production line (screen printing line).

In the method 1000 described herein, the additional protective layer 1080 for the low-e coating 1075 is made to protect the low-e coating during the application of the visual markers 670, on the first face 1001 which is opposed to the second face 1002 with low-e.

Eventually, the step immediately preceding the final step of tempering 1048 (prior to manufacturing of the sealed unit at step 1050) comprises either the step 1046 of removing protective film 1080, before tempering, in the case of the protective film, or leaving the protective layer 1080 for burning during tempering, if the low-e coating 1075 is covered with the consumable protective layer.

Thus, in the method 1000 as described herein, the visual markers are applied on face 601, and not on face 602 of the glazing 610.

Figure 11:
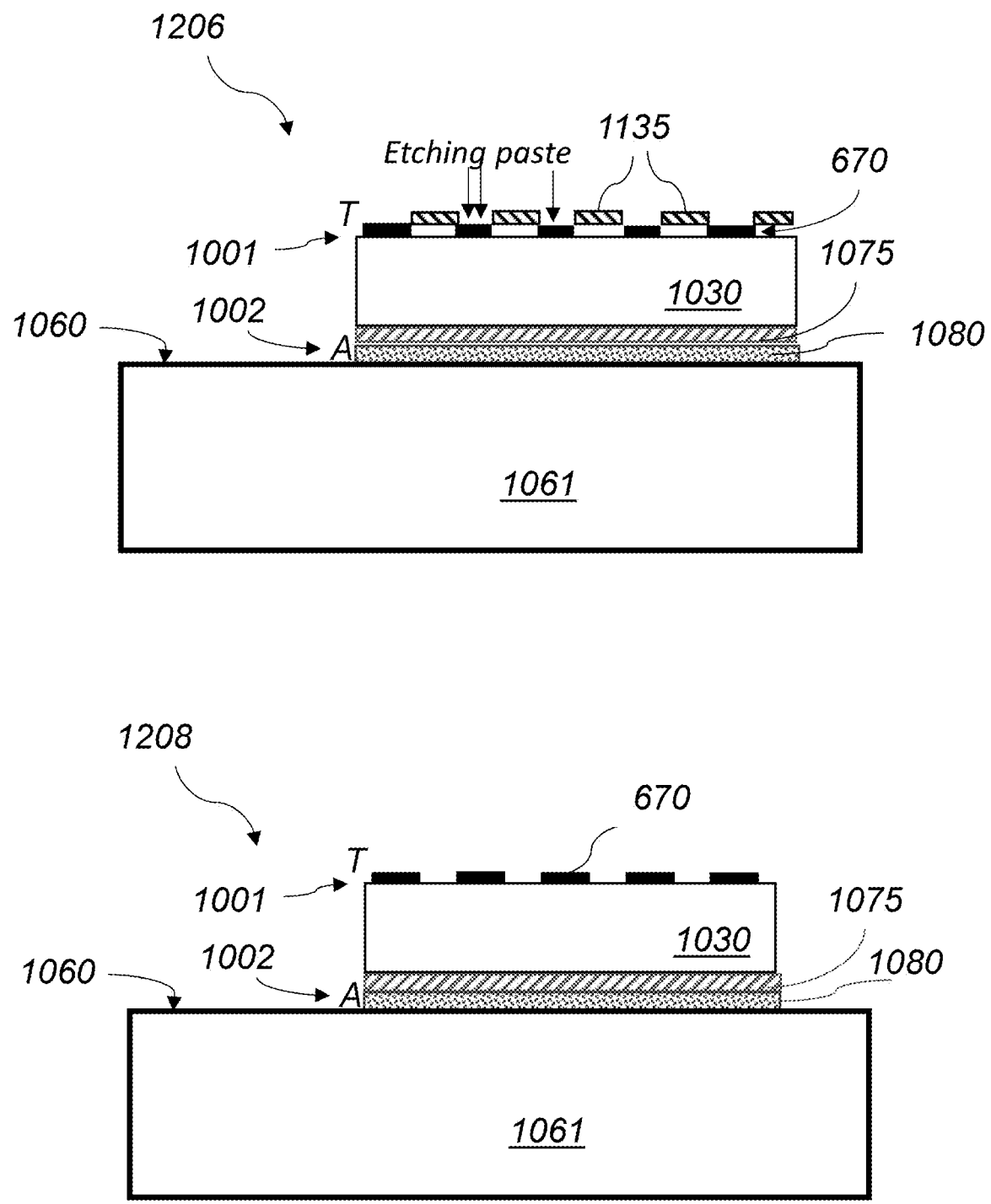
FIG. 11 illustrates the low-emissivity protected glass piece during the execution of steps of the method of FIG. 10.

Referring to FIGS. 10 and 11, according to an embodiment of the invention, at step 1042 the glass is placed on a surface 1060 of a screen printing table 1061, the low-e face 1002 (also referred to herein as the "second face 1002") with its protective layer 1080 in contact with the surface 1060 of the screen printing table 1061. Using a screen printing canvas 1135 on the opposed face 1002 which is oriented upwardly, the visual markers 670 are printed thereon with an acid paste which attacks the glass 1030 to give a frosted finish, such as a satin frosted finish.

The method 1000 described herein comprises applying visual markers 670 on a face that is opposite to the face having a low-e coating 1075. The technology described herein seeks to achieve the application of the visual markers 670 after the application of the low-e coating 1075, while the conventional method (such as, for example, conventional method 900) would apply the low-e coating after the visual markers have been applied.

In the method 1000 as described herein, the protection film 1080 applied on the low-e coating 1075 is used to insure the protection of the low-e coating 1075 during the application of the visual markers 670 on the opposite face of the glass piece 1030. The visual markers 670 are sufficiently resistant to be in contact with rollers 417, 418, 419, 420 of the tempering furnace 400 during the glass tempering.

Thus, the low-e coating 1075 is applied to the glass piece 1030 before the application of the frosted pattern. The frosted pattern is then created (applied) with the acid on the side opposed to the low-e coating 1075.

After a certain period of time which, according to an embodiment, ranges between 2 and 6 minutes, and preferably about 5 minutes, the glass 1030 is washed to remove the acid paste at step 1208. A permanent frosted finish pattern with visual markers 670 is thereby obtained as a result. It should be noted that the visual markers 670 obtained by such a method 1000 are provided in a visible range of spectrum and are not the ultraviolet (UV) markers.

The method 1000 differs from the conventional method, among others, in that the bird-friendly pattern is applied and thus the visual markers 670 are produced after the low-emissivity coating 1075 has been applied (and/or provided). Such a sequence of steps of method 1000 provides significant advantages during manufacturing. Such advantages may be achieved due to the fact that the piece of glass 1030 may be handled and used for screen printing despite the low-emissivity coating 1075 being already applied to that piece of glass 1030, thanks to the removable protective film or consumable protective layer 1080, which allows placing the piece of glass with the face 1002, comprising the low-emissivity coating 1080 downwardly onto the ceramic rollers 417 of the tempering furnace 400. The method 1000 as described herein permits to avoid destruction of the low-emissivity coating 1075 if laying on the rollers 417 that would be expected when using conventional methods of manufacturing the glazing units.

Figure 12:
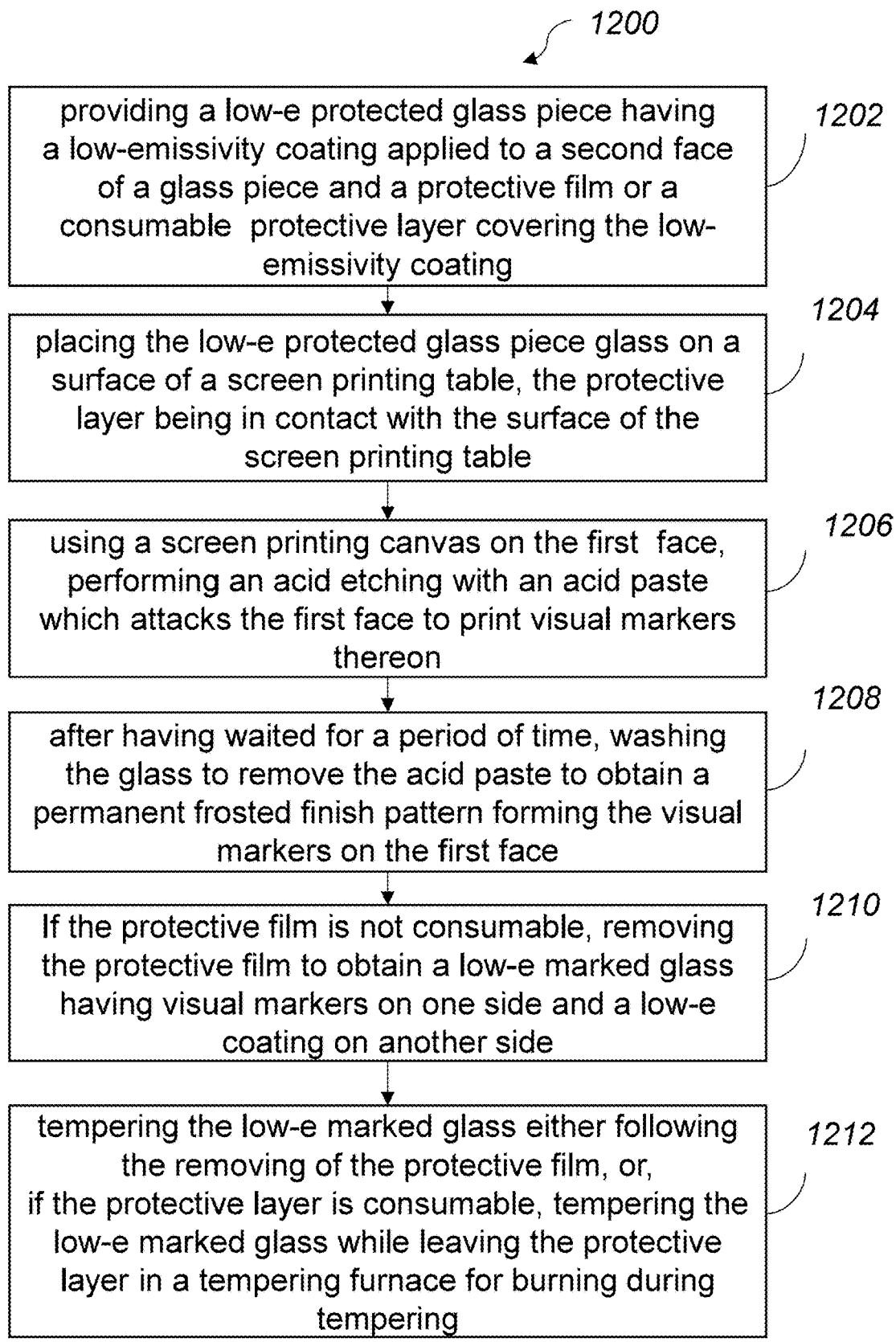
FIG. 12 illustrates a method of manufacturing of glazing, in accordance with at least one embodiment of the present disclosure.

FIG. 12 illustrates a method 1200 for manufacturing a glazing, in accordance with at least one embodiment of the present disclosure. Reference is also made to FIGS. 10-11. At step 1202 of method 1200, a low-e protected glass piece 1035 is provided. The low-e protected glass piece 1035 has a glass piece with a first face 1001 and a second face 1002, the first face 1001 opposing the second face 1002, the low-e protected glass piece 1035 having a low-emissivity coating 1075 applied to the second face 1002 of the glass piece 1030 and a protective film 1080 covering the low-emissivity coating 1075. At step 1204, the low-e protected glass piece 1035 is placed on a surface 1060 of a screen printing table 1061, the low-e face with the protective layer 1080 being in contact with the surface 1061 of the screen printing table 1060.

At step 1206, a screen printing canvas 1135 is used on the first face which is oriented upwardly, performing an acid etching with an acid paste which attacks the glass 1030 on the first face 1001 (opposing the low-e second face 1002) to print the visual markers 670 thereon. At step 1208 after having waited for a period of time ranging between 2 and 6 minutes, the glass 1030 is washed to remove the acid paste to obtain a permanent frosted finish pattern forming the visual markers on the first face. At step 1210, the protective film is removed to obtain a low-e marked glass having visual markers 670 on one side 1001 and a low-e coating on another side 1002. At step 1212, following the removing of the protective film 1080, the low-e marked glass 1065 is tempered to obtain glazing 1068. Alternatively, if, instead of the protective film 1080, the low-e coating 1075 is covered with a consumable protective layer 1080, such protective layer 1080 is left on the low-e marked glass 1068 (illustrated in FIG. 10) during tempering of the low-e marked glass 1068 in the tempering furnace 400. The consumable protective layer is thus burned during tempering in the tempering furnace 400.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for manufacturing a glazing comprising the steps of:
    providing a low-emissivity protected glass piece having a glass piece with a first face and a second face, the first face opposing the second face, the low-emissivity protected glass piece having
        a low-emissivity coating applied to the second face of the glass piece and
        a protective film covering the low-emissivity coating;
    placing the low-emissivity protected glass piece on a surface of a screen printing table, the protective layer being in contact with the surface of the screen printing table;
    using a screen printing canvas on the first face, performing an acid etching with an acid paste which attacks the first face of the low-emissivity protected glass piece to print visual markers thereon;
    after having waited for a period of time, washing the first face of the low-emissivity protected glass piece to remove the acid paste to obtain a permanent frosted finish pattern forming the visual markers on the first face;

removing the protective film to obtain a low-e marked glass having the visual markers on one side and the low-emissivity coating on another side; and following the removing of the protective film, tempering the low-e marked glass.

2. The method of claim 1, further comprising, prior to placing the low-emissivity protected glass piece on the surface of the screen printing table, providing the glass piece having the low-emissivity coating applied to the second face of the glass piece; and applying the protective film onto the low-emissivity coating to obtain the low-emissivity protected glass piece.

3. The method of claim 1, wherein the period of time is ranging between 2 and 6 minutes.

4. The method of claim 1, wherein the period of time is about 5 minutes.

5. The method of claim 1, wherein the low-emissivity coating is transparent in a visible spectrum.

6. The method of claim 1, wherein the tempering of the low-emissivity marked glass is performed when the visual markers are in contact with rollers of a conveyor of a tempering furnace.

7. A method for manufacturing a glazing comprising the steps of:

providing a low-emissivity protected glass piece having a glass piece with a first face and a second face, the first face opposing the second face, the low-emissivity protected glass piece having a low-emissivity coating applied to the second face of the glass piece and a consumable protective layer covering the low-emissivity coating;

placing the low-emissivity protected glass piece on a screen printing table, the consumable protective layer of the low-emissivity protected glass piece being in contact with the surface of the table;

using a screen printing canvas on the second face, performing an acid etching with an acid paste which attacks the second face to print visual markers thereon;

after having waited for a period of time, washing the glass to remove the acid paste to obtain a permanent frosted finish pattern forming the visual markers; and tempering the low-emissivity marked glass while leaving the protective layer in a tempering furnace for burning during tempering.

8. The method of claim 7, further comprising, prior to placing the low-emissivity protected glass piece on the surface of the screen printing table, providing the glass piece having the low-emissivity coating applied to the second face of the glass piece; and applying the consumable protective layer onto the low-emissivity coating to obtain the low-emissivity protected glass piece.

9. The method of claim 7, wherein the period of time is ranging between 2 and 6 minutes.

10. The method of claim 7, wherein the period of time is about 5 minutes.

11. The method of claim 7, wherein the low-emissivity coating is transparent.

12. The method of claim 7, wherein the tempering of the low-emissivity marked glass is performed when the visual markers are in contact with rollers of a conveyor of the tempering furnace.

* * * * *